United States Patent [19]

Yamagami

[11] Patent Number: 5,754,820
[45] Date of Patent: May 19, 1998

[54] MICROPROCESSOR SYSTEM WITH CACHE MEMORY FOR ELIMINATING UNNECESSARY INVALIDATION OF CACHE DATA

[75] Inventor: Nobuhiko Yamagami, Tokyo, Japan

[73] Assignee: Kabushiki Kaisha Toshiba, Tokyo, Japan

[21] Appl. No.: 440,118

[22] Filed: May 12, 1995

Related U.S. Application Data

[63] Continuation of Ser. No. 911,074, Jul. 9, 1992, abandoned.

[30] Foreign Application Priority Data

Jul. 9, 1991 [JP] Japan .................................. 3-167903

[51] Int. Cl.$^6$ .................................................. G06F 13/00
[52] U.S. Cl. .......................... 395/460; 395/466; 395/472
[58] Field of Search ................................ 395/440, 445, 395/465, 472, 466, 471, 460, 462

[56] References Cited

U.S. PATENT DOCUMENTS

| | | | |
|---|---|---|---|
| 4,816,991 | 3/1989 | Watanabe et al. | 395/400 |
| 4,885,680 | 12/1989 | Anthony et al. | 395/425 |
| 4,933,835 | 6/1990 | Sach et al. | 395/425 |
| 5,091,850 | 2/1992 | Culley | 395/400 |
| 5,097,532 | 3/1992 | Borup et al. | 395/425 |
| 5,155,834 | 10/1992 | Ryan et al. | 395/425 |
| 5,157,774 | 10/1992 | Culley | 395/425 |
| 5,226,133 | 7/1993 | Taylor et al. | 395/400 |
| 5,283,880 | 2/1994 | Marcias-Garza | 395/445 |
| 5,303,364 | 4/1994 | Mayer et al. | 395/425 |
| 5,307,477 | 4/1994 | Taylor et al. | 395/425 |
| 5,355,467 | 10/1994 | MacWilliams et al. | 395/425 |

OTHER PUBLICATIONS

"SPARC RISC User's Guide", Ross Technologies, Inc., Feb. 1990, pp. 4–1 to 4–83.

*Primary Examiner*—David L. Robertson
*Attorney, Agent, or Firm*—Oblon, Spivak, McClelland, Maier & Neustadt, P.C.

[57] ABSTRACT

In a cache memory control apparatus, a cache hit ratio of a cache memory is increased by employing both of control information (cacheable or non-cacheable) and condition information (invalidation or validation) to avoid unnecessary invalidation of the cache data. The microprocessor system with a cache memory control apparatus includes a microprocessor for processing various data. A main memory unit stores main data in a designated physical address allocated by a page unit. An auxiliary memory unit stores auxiliary data in a designated physical address allocated by a page unit. A cache memory temporarily stores a portion of the main data to be stored in the main memory unit. A virtual memory space manages by a virtual address to transfer the main data between the microprocessor and the main memory unit through the cache memory and also to transfer the auxiliary data between the microprocessor and the auxiliary memory units. A virtual memory control unit controls the virtual memory space and outputs an indicating information of cacheable or non-cacheable. A register stores a mode value which is given from the microprocessor to discriminate data from the microprocessor to be stored in the main memory unit or in the auxiliary memory units. A cache memory control unit lets the cache memory be cacheable or non-cacheable based upon the indicating information from the virtual memory control unit and, in a case of non-cacheable and the mode value discriminating the data from the microprocessor to be stored in the auxiliary memory units, lets the microprocessor directly access the auxiliary memory units and lets the cache memory keep valid.

6 Claims, 3 Drawing Sheets

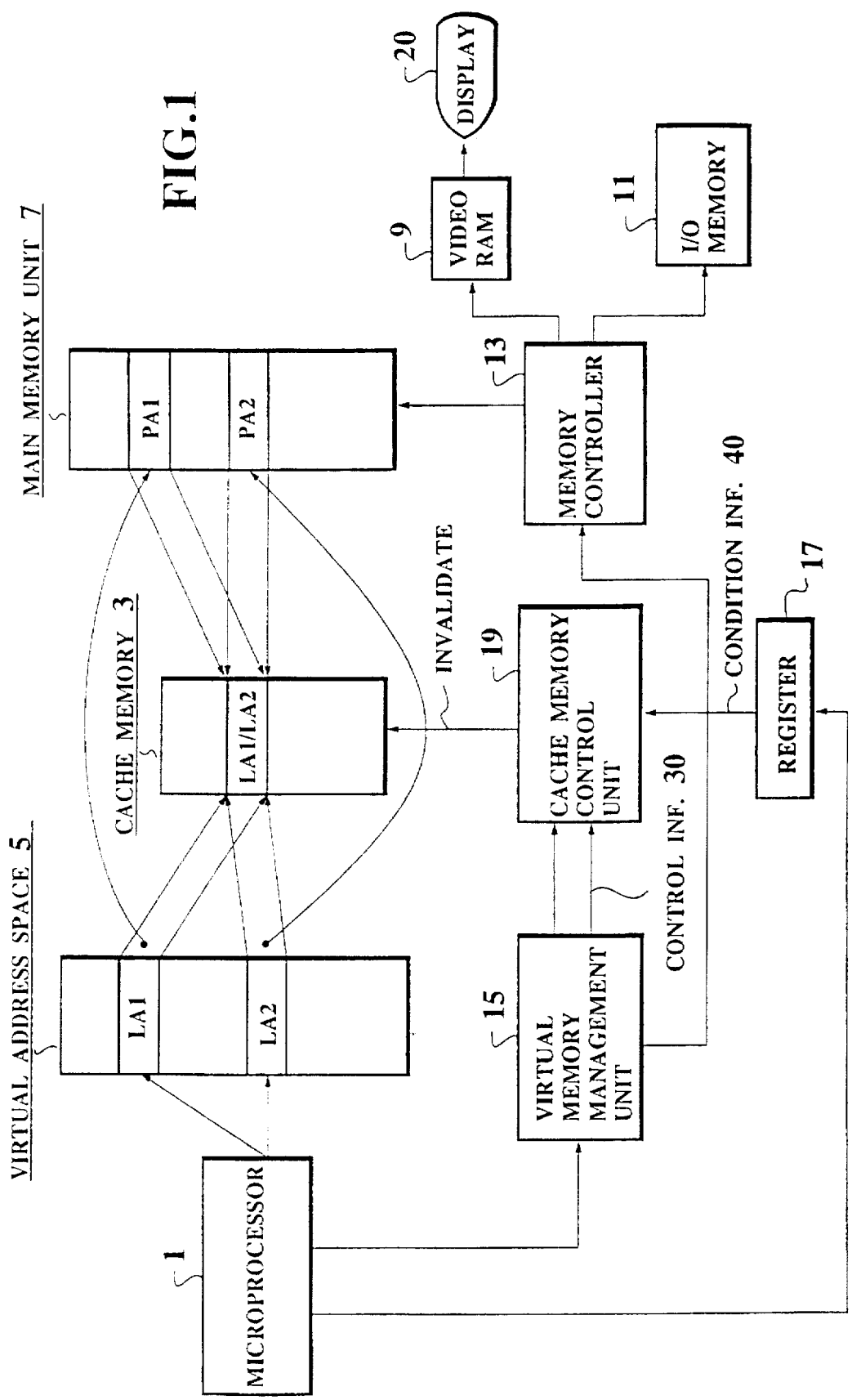

FIG.2A

TAG MEMORY TABLE 21

| PA1 | FIRST MODE 1 | |
|-----|--------------|---|
| PA2 | SECOND MODE 2 | |

CONTROL INFORMATION 30

FIG.2B

MODE VALUE TABLE 23

| 1 | MAIN MEMORY UNIT 7 |
|---|--------------------|
| 2 | VIDEO RAM 9 |
| 3 | I/O MEMORY 11 |

MICROPROCESSOR SYSTEM WITH CACHE MEMORY FOR ELIMINATING UNNECESSARY INVALIDATION OF CACHE DATA

This application is a Continuation of application Ser. No. 07/911,074, filed on Jul. 9, 1992, now abandoned.

BACKGROUND OF THE INVENTION

1. Field of the Invention

The present invention generally relates to a cache memory control apparatus employed in a microcomputer system. More specifically, the present invention is directed to such a cache memory control apparatus capable of preventing cache memory data from being unnecessarily invalidated, and of increasing a process speed of the microcomputer system by improving a cache hit ratio.

2. Description of the Prior Art

Various types of cache memory control apparatuses for discriminating a cache hit from a mis-hit based upon a virtual address, have been widely utilized. A typical one of these cache memory control apparatuses is described in, for instance, "Cache Controller and Memory Management Unit, CY7C604" by CYPRESS SEMICONDUCTOR in U.S.A., issued on Aug. 10, 1989.

In such a conventional cache memory control apparatus, a block "LA1" of a virtual address space designates a block "PA1" of a physical address space for a main memory unit (not shown) at which data have been actually stored. When the block "LA1" of the virtual address space is accessed by the microprocessor with this cache memory control apparatus, unless data designated by the block PA1 of the physical address space corresponding to this virtual address block LA1 has been duplicated, or written into the cache memory, a mis-hit (i.e. miss) happens to occur. As a result, this data at the physical address block "PA1" of the main memory unit will be transferred to the cache memory.

It is now assumed that when both of the blocks "LA1" and "LA2" of the virtual address space designate a single block "PA1" of the physical address space for the main memory unit (as in a case that two programs are independently operated), the data designated by the physical address "PA1" of the main memory unit have been written into the cache memory. Then, when this cache memory is accessed based upon one block "LA2" of the virtual address space, if a mis-hit happens to occur under condition that the data designated by the block PA1 of the physical address space for the main memory unit have been rewritten by predetermined data, the first-mentioned data written into this cache memory are univocally invalidated by the conventional cache memory control apparatus. The reason why the data stored in the cache memory are invalidated under such a circumstance is, unless indicated the other block "LA1" of the virtual address space should refer to the old data to be invalidated. As a result of univocally invalidating the old data stored in the cache memory, the cache hit ratio of the cache memory cannot be readily increased.

Furthermore, in accordance with the conventional cache memory control apparatus, when the mis-hit happens to occur, even such data stored in the cache memory which are not required to be originally invalidated, are erroneously invalidated. For instance, when the data of the video RAM is accessed by the microprocessor with this cache memory control apparatus and also the mis-hit happens to occur, this data need not be originally invalidated by the cache memory control apparatus, because this data is non-cachable and it does not correspond to so-called "cache data". As a consequence, the cache hit ratio is furthermore decreased. Since the data are transferred from the physical memory to the cache memory in units of data blocks, the data process operation is considerably delayed in the microprocessor system equipped with the above-described conventional cache memory control apparatus.

SUMMARY OF THE INVENTION

The present invention has been made in an attempt to solve the above-described problems, and therefore has a primary object to provide a cache memory control apparatus capable of preventing unwanted invalidation of data stored in a cache memory.

A secondary object of the present invention to provide a microprocessor system capable of preventing delays in data processing speed, equipped with a cache memory control apparatus capable of improving the cache hit ratio of cache memory data.

To achieve the above-described objects, the present invention includes a microprocessor system with a cache memory control apparatus. In such a device, the microprocessor processes various data. The main memory unit stores main data in a designated physical address allocated by a page unit. An auxiliary memory unit stores auxiliary data in a designated physical address allocated by the page unit. Further, a cache memory temporarily stores a portion of the main data to be stored in the main memory. A virtual memory space manages by a virtual address transferring the main data between the microprocessor and the main memory unit through the cache memory and also transfers the auxiliary data between a microprocessor and the auxiliary memory units. A virtual memory control unit controls the virtual memory space and outputs an indicating information of cachable or non-cachable. Further, a register stores a mode value which is given from the microprocessor to discriminate data from the microprocessor to be stored in the main memory unit or in the auxiliary memory units. Furthermore, a cache memory control unit lets the cache memory be cachable or non-cachable based upon the indicating information from the virtual memory control unit and, in a case of non-cachable and the mode value discriminating the data from the microprocessor to be stored in the auxiliary memory units, lets the microprocessor directly access the auxiliary memory unit and lets the cache memory keep valid.

BRIEF DESCRIPTION OF THE DRAWINGS

For a better understanding of the present invention, reference is made of the following description in conjunction with the accompanying drawings, in which:

FIG. 1 is a schematic block diagram for showing an overall arrangement of a microprocessor system including a cache memory control apparatus according to a preferred embodiment of the present invention;

FIG. 2A schematically shows a tag memory table, and FIG. 2B schematically indicates a mode value table, which are employed in the virtual memory management unit of FIG. 1.

DETAILED DESCRIPTION OF PREFERRED EMBODIMENTS

Figure 3:
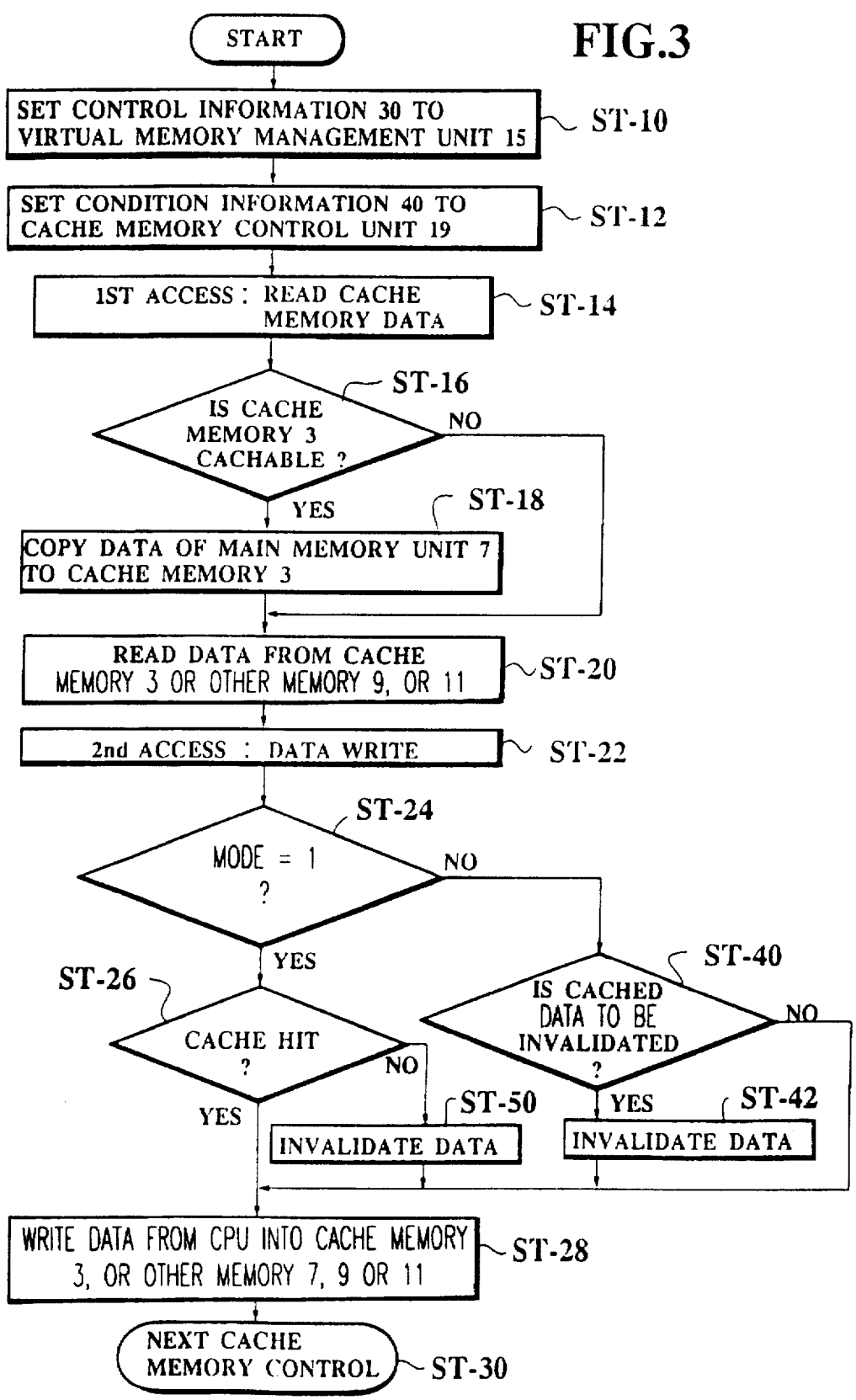
FIG. 3 is a flow chart for explaining a cache memory control operation of the cache memory control apparatus shown in FIG. 1.

Overall Arrangement of Microprocessor System Including Cache Memory Control Apparatus FIG. 1 is a schematic block diagram for representing an overall arrangement of a microprocessor system including a cache memory control apparatus according to a preferred embodiment of the present invention.

In the microprocessor system shown in FIG. 1, a microprocessor 1 executes various control operations such as an access control to a cache memory 3 based on blocks "LA1" and "LA2" of a virtual address space 5.

The cache memory 3 has been designated by the virtual address with respect to page allocation thereof, and stores therein only a portion of the entire data stored in a main memory unit 7 (as will be described later), so that a highspeed access operation by the microprocessor 1 can be realized in conjunction with this cache memory 3.

In the virtual address space 5, the virtual address designated by a user is allocated in units of address blocks to the cache memory 3, e.g., a first virtual address block corresponds to "LA1", and a second virtual address block corresponds to "LA2".

The main memory unit 7 and also a video RAM and an I/O memory 11 stores therein data at physical addresses thereof, and are segmented in units of physical address blocks such as "PA1" and "PA2" in relation to the cache memory 3. That is, the first block PA1 of the physical address space for the main memory unit 7 corresponds to the above-described block "LA1" of the virtual address space for the virtual address space 5, whereas the second block "PA2" of the physical address space corresponds to the block "LA2" of the virtual address space.

A video RAM (random access memory) 9 stores image data at a predetermined address thereof, which will be displayed on a display unit 20, and an I/O (input/output) memory 11 stores various I/O data at preselected addresses thereof.

A main memory controller 13 controls data read/write operations executed in the main memory unit 7, video RAM 9 and I/O memory 11.

Control Inf./Condition Inf.

A virtual memory management unit 15 stores/manages control information 30 given to each page of the virtual address space 5.

To the respective pages of the virtual address space 5 in accordance with the first preferred embodiment, the control information 30 for designating memory allocation conditions of these pages, namely cachable, or non-cachable information 30 is given. Then, the control information 30 is stored and managed in the virtual memory management unit 15. When the data is referred under control of the microprocessor 1, the control information 30 corresponding to this referred data is read out from the virtual memory management unit 15 and thereafter is supplied to a cache memory control unit 19.

On the other hand, the cache memory control unit 19 receives the above-explained control information 30 from the virtual memory management unit 15, and also receives condition information 40 for discriminating mode 1, 2, or 3 which has been set in a register 17 by the control program of the microprocessor 1. Based upon comparison between two different information 30 and 40, this cache memory control unit 19 determines whether or not data stored in the cache memory 3 should be invalidated when a mis-hit happens to occur in the cache memory data. That is, when such a mis-hit happens to occur under the non-cachable access operation, a decision is made whether or not the data stored in the cache memory 3 should be invalidated as described below.

Memory Tables

Referring now to contents of a tag memory table 21 and a mode value table 23 shown in FIGS. 2A and 2B, the above-described control information 30 will be described in more detail.

A tag memory table 21 shown in FIG. 2A and a mode value table 23 indicated in FIG. 2B are included in the virtual memory management unit 15. As shown in FIG. 2A, both of the physical address block "PA1" and a first mode value indicative of any one of the main memory unit 7, the video RAM 9 and the I/O memory 11 (e.g., mode "1" in this preferred embodiment) have been stored at a second line of the tag memory table 21. Similarly, both of the physical address block "PA2" and a second mode value representative of one of these memories 7, 9 and 11 (e.g., mode 2 in this preferred embodiment) have been stored at a third line of the tag memory table 21.

When the block "LA1" of the virtual address in the virtual address space 5 is accessed by the microprocessor 1, the data stored in the second line of the tag memory table 21 (namely, the physical address "PA1" and the first mode value "1") are read out by the virtual memory management unit 15. Similarly, when the block "LA2" of the virtual address in the virtual address space 5 is accessed by the microprocessor 1, the data stored in the third line of the tag memory table 21 (namely, the physical address "PA2" and the second mode value "2") are read out by this virtual memory management unit 15.

FIG. 2B represents the content of the mode memory table 23. As apparent from this memory table, when the mode value is "1", it indicates that the address space is belonging to the main storage unit 7; when the mode value is "2", it indicates that the address space is belonging to the video RAM 9; and when the mode value is "3", it indicates that the address space is belonging to the I/O memory 11.

Then, when the virtual address block LA1 of the virtual address space 5 is accessed for rewriting under control of the control program of the microprocessor 1, the data stored at the second line of the tag memory table 21, i.e., the physical address block "PA1" is retrieved by the virtual memory management unit 15 and the first mode value "1" is set in the register 17.

Then, these data are handed to the cache memory control unit 19, and the unit 19 judges whether the cache memory should be invalidated even if under the non-cachable conditions. On the contrary, even if the first mode value is set to "2" or "3", the unit 19 judges no invalidations necessary.

Overall Operation of Cache Memory Control Apparatus

Referring now to the flow chart of FIG. 3, an overall cache memory control operation according to the preferred embodiment will be described.

At a first step ST-10, the control information 30 is set to the virtual memory management unit 15. This control information 30 includes conversion information between the virtual address and the physical address, and also cachable/non-cachable information.

At a next step ST-12, the condition information 40 is set to the cache memory control unit 19. This condition indicates the data from the microprocessor 1 is to be written into the main memory unit 7, the video RAM 9 or the I/O memory by setting the mode value "1", "2", or "3", respectively.

Thereafter, a first access operation is carried out under control of the microprocessor 1 at a step ST-14, to read data.

Then, at a subsequent step ST-16, a check is made whether or not this corresponding address space is cachable.

If this cache memory 3 is cachable ("YES"), then the memory control operation is advanced to a step ST-18, because normally, no data has been stored in the cache memory 3. At this step ST-18, the data stored in the main memory unit 7 are copied to the cache memory 3. To the contrary, if the cache memory 3 is not cachable ("NO"), then the memory control operation is advanced to a further step ST-20 at which the data stored in the cache memory 3 or stored in the other memories 9 and 11 are read.

On the other hand, when the data copy operation from the main memory unit 7 to the cache memory 3 as defined at the previous step ST-18 is accomplished, the cache memory control operation is advanced to the above step ST-20.

Subsequently, a second access operation is executed under control of the microprocessor 1 and then data write operation is performed at a step ST-22. In data write operation, firstly a check of the mode value is carried out by "mode=1" or not at step ST-24.

At this step ST-24, if the corresponding address space is ("YES") belonging to the main memory unit 7, then a further check is done at a next step ST-26 whether or not a cache hit is available. Normally, if the data stored in the main memory 7 is transferred to and written into the cache memory 3, all of these check results at the steps ST-24 and 26 become "YES". Accordingly, data write operation into the cache memory 3 is performed at a step ST-28. Thereafter, the cache memory control operation is continued in a similar manner to the above-described steps at a step 30.

Returning back to the step ST-22, when the second access operation is carried out under control of the microprocessor 1, if the data stored in CPU (not shown) of this microprocessor 1 is transferred to the video RAM 9 via a data transfer bus (not shown in detail), this video RAM data is non-cachable and not stored in the cache memory 3. As a consequence, the corresponding mode value set in the register 17 is not "2" at the judging step ST-24 (namely, "NO"). Then, at a further step ST-40, another check is done whether or not the cache memory data should be invalidated. In this case, since the video RAM data must not be cached in the cache memory 3, the present data in the cache memory 3 is not originally needed to be invalidated, this judgement result becomes "NO". Then, the control operation is advanced to the above-described step ST-28, so that the data from the CPU is transferred and written into the video RAM 9. It should be noted that the above-described judging operation at the step ST-40 is carried out by the cache memory control unit 19 based upon both of the previously set control information 30 and also condition information 40.

On the other hand, when a data transfer/write operation other than in the main memory unit 7 is carried out during the second access operation at the step ST-22, the accessed address space is not cachable ("NO"). However, there is a certain possibility that this data should be invalidated at a step ST-42. Then, the control operation is advanced to the step ST-28.

At the previous step ST-26, if no cache hit is available ("NO"), then the data stored in the cache memory 3 should be invalidated as previously explained in detail, due to some reasons, e.g., occurrence of mis-hit in the cache memory 3. Subsequently, the control operation is advanced to the step ST-28, and the data transferred from the CPU are directly written into the main memory, unit 7.

As previously explained in detail, according to the cache memory control operation of the present invention, since when the data stored in the any memories other than the main memory unit 7 is transferred/written in the CPU of the microprocessor 1, this data need not be originally invalidated, no data invalidation operation is performed. In other words, since such unnecessary data invalidation can be prevented, the cache hit ratio can be increased as compared with that of the conventional cache memory control apparatus.

Furthermore, since the cache hit ratio of the cache memory control apparatus can be increased, the process speed of the microprocessor system employing such a cache memory control apparatus can be increased.

What is claimed is:

1. A microprocessor system with a cache memory control apparatus using a virtual memory managing technique and executing a multitasking operation comprising:

a microprocessor for processing various data;

main memory means for storing main data in a designated physical address, the address being set for each page of blocks allocated in said main memory means;

auxiliary memory means for storing auxiliary data in a designated physical address, the address being set for each page of blocks allocated in said auxiliary memory means;

a cache memory for temporarily storing a portion of said main data to be stored in said main memory means;

a virtual address space for determining a virtual address corresponding to said physical address in said main memory means or said auxiliary memory means;

virtual memory managing means for managing by said virtual address to transfer said main data between said microprocessor and said main memory means through said cache memory and also to transfer said auxiliary data between said microprocessor and said auxiliary memory means and for outputting an indicating information of whether the main data is to be transferred through the cache memory and be cachable or is not to be transferred through the cache memory and be non-cachable;

a register for storing a mode value which is given from said microprocessor to represent whether data from said microprocessor is to be stored in said main memory means or in said auxiliary memory means; and cache memory control means for letting said microprocessor cache or non-cache said cache memory based upon said indicating information from said virtual memory managing means and, in a case of non-cachable and said mode value indicating said data from said microprocessor is to be stored in said auxiliary memory means, said microprocessor accesses said auxiliary memory means and stores said data therein and does not invalidate the cache memory.

2. A microprocessor system with a cache memory control apparatus as claimed in claim 1, wherein said auxiliary memory means includes a video RAM and an I/O memory.

3. A microprocessor system with a cache memory control apparatus using a virtual memory managing technique and executing a multitasking operation comprising:

main memory means for storing main memory data;

cache memory means for temporarily storing a portion of said main memory data at a predetermined memory region thereof as a page allocated by a virtual address of a microprocessor;

auxiliary memory means for storing auxiliary memory data which is not stored in said cache memory means, but which is accessible by said microprocessor;

virtual memory managing means for storing/managing control information for designating each of the pages of a virtual address; and cache memory control means for previously setting therein condition information as to whether data is to be stored in the main memory means or auxiliary memory means under control of the microprocessor, and for judging at least whether or not said portion of the main memory data stored in the cache memory means is to be invalidated based upon both of said control information and said condition information when said portion of the main memory data is updated and the cache memory means is accessed, and wherein the microprocessor does not invalidate the cache memory when the condition information indicates that the data is to be stored in the auxiliary memory means and a mis-hit occurs in accessing said cache memory means.

4. A microprocessor systems as claimed in claim 3, wherein said cache memory control means includes:

a register for previously setting said condition information therein; and a cache memory control unit for judging whether or not said portion of the main memory data stored in the cache memory means is invalidated in response to both of said control information transferred from said virtual memory managing means and said condition information supplied from said register.

5. A microprocessor system as claimed in claim 3, wherein said control information indicates that a content of the cache memory means is cachable, or non-cachable; and said cache memory control means further judges whether or not said portion of the main memory data stored in the cache memory means is invalidated when said auxiliary memory data is transferred between said microprocessor and said second memory means which implies a non-cachable content of said cache memory means, and also the mis-hit happens to occur in said cache memory means.

6. A microprocessor system as claimed in claim 3, wherein said auxiliary memory means includes at least a video RAM and an I/O memory.

* * * * *